(No Model.) 2 Sheets—Sheet 1.
J. F. BAKER.
FENDER FOR STREET CARS.
No. 597,936. Patented Jan. 25, 1898.
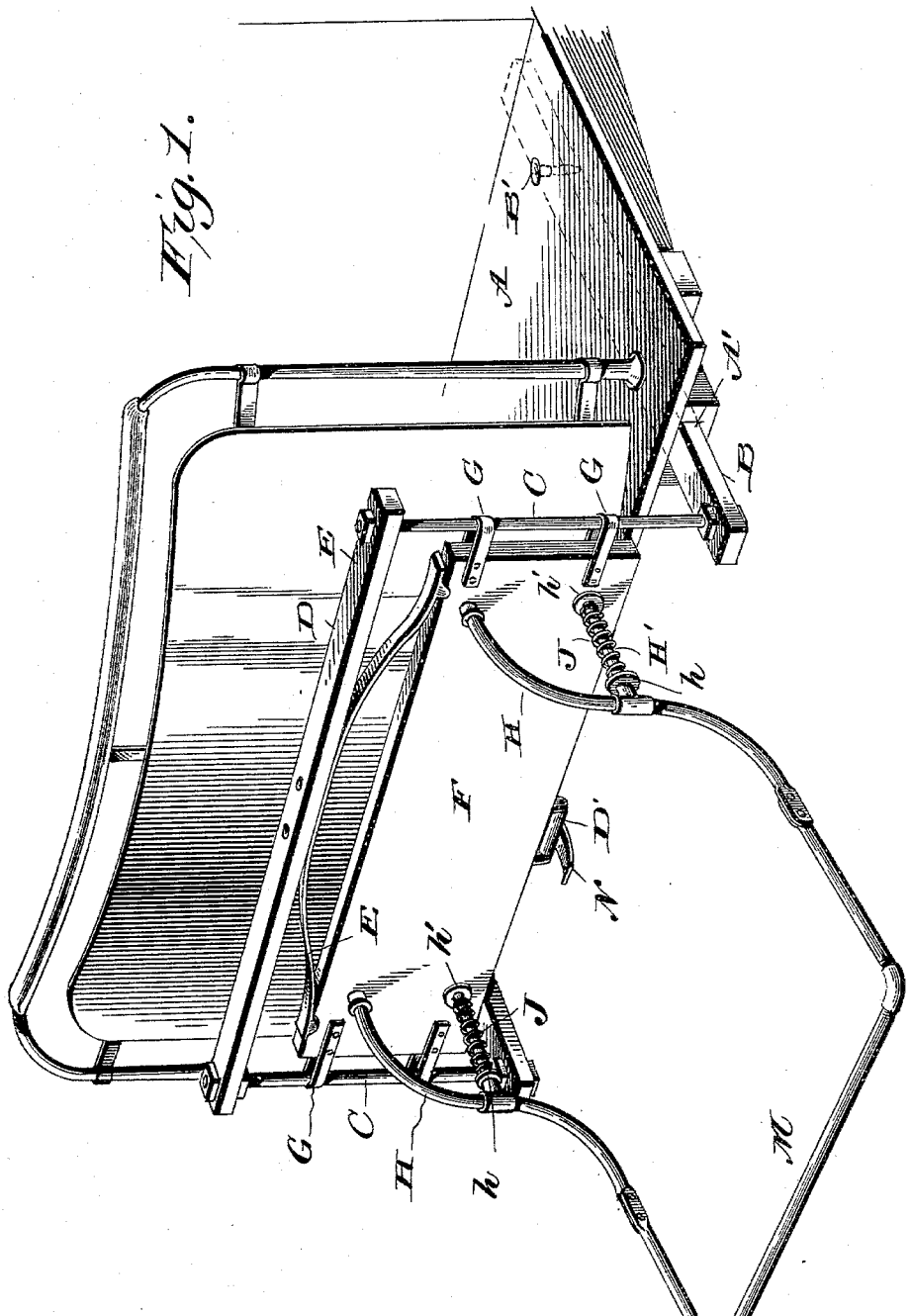
Witnesses
L. C. Hills.
A. L. Hough
Inventor
Jno. F. Baker,
by Franklin H. Hough
Attorney

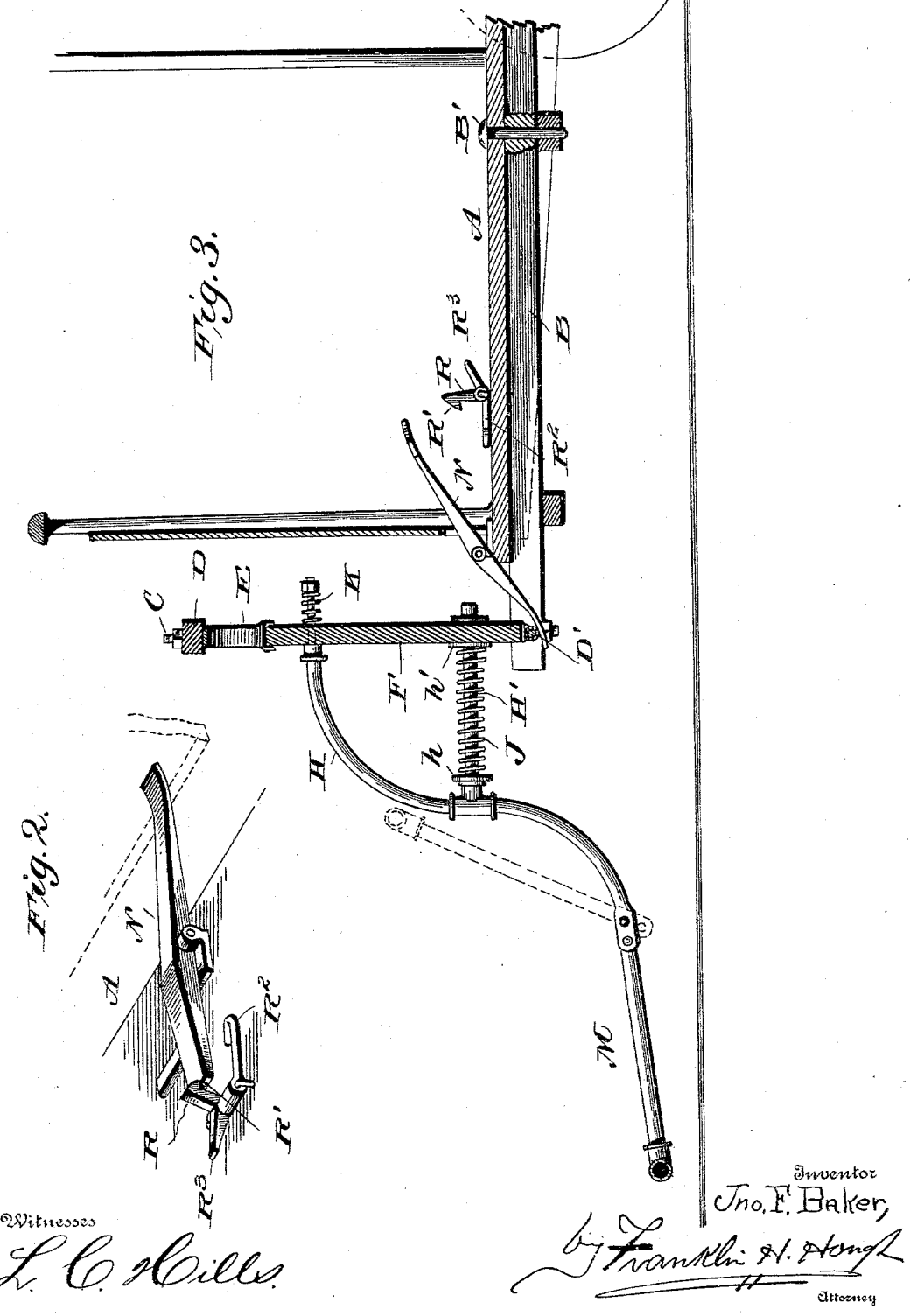

UNITED STATES PATENT OFFICE.

JOHN F. BAKER, OF VINCENNES, INDIANA.

FENDER FOR STREET-CARS.

SPECIFICATION forming part of Letters Patent No. 597,936, dated January 25, 1898.

Application filed November 23, 1897. Serial No. 659,590. (No model.)

*To all whom it may concern:*

Be it known that I, JOHN F. BAKER, a citizen of the United States, residing at Vincennes, in the county of Knox and State of Indiana, have invented certain new and useful Improvements in Fenders for Street-Cars; and I do declare the following to be a full, clear, and exact description of the invention, such as will enable others skilled in the art to which it appertains to make and use the same, reference being had to the accompanying drawings, and to the letters of reference marked thereon, which form a part of this specification.
This invention relates to certain new and useful improvements in fenders, and especially to a fender for street and other cars of the class commonly known as "drop-scoop" fenders, which are adapted to be held normally in an elevated position, means being provided to drop the same when coming in contact with an obstruction.

A further part of the invention resides in the provision of a fender having a pivoted scoop which may be raised or lowered and mounted upon vertical rods, a suitable spring being provided to throw the fender down as it is released by means of a foot-lever, the bars carrying the fender being held upon strips which are adjustably held to the platform of a car in any suitable manner, whereby the fender may be easily and quickly removed or replaced. In connection with the fender a foot-operating lever is provided, which is pivoted to the platform of a car and has its free end engaging underneath the lower edge of the strip-carrying fender and working on an antifriction-roller, whereby the said strip may be raised against the tension of the spring and held in an elevated position by means of a latch which is pivoted to the platform of the car and by which the lever may be released when it is desired to lower the fender.

To these ends and to such others as the invention may pertain the same consists, further, in the novel construction, combination, and adaptation of the parts, as will be hereinafter more fully described, and then specifically defined in the appended claims.
The invention is clearly illustrated in the accompanying drawings, which, with the letters of reference marked thereon, form a part of this application, and in which drawings similar letters of reference indicate like parts throughout the several views, in which—

Figure 1 is a perspective view of the improved fender shown as adjusted to the end of a car and held in its relative position. Fig. 2 is a detail view of the lever-operating mechanism and catch for holding the same. Fig. 3 is a view in side elevation, showing the fender lowered into the position that it assumes when it is in readiness to receive an obstruction on the track.

Reference being had to the details of the drawings by letter, A designates the platform of the car, which has suitable apertures A' therein, adapted to receive the sliding bars B, which are held in place by means of adjusting-bolts B', as shown. Mounted on the forward ends of the said strips are the vertical rods C, which are screw-threaded and held in place by means of suitable nuts, and to the upper ends of the said rods is held by means of suitable nuts the cross-piece D, which carries on its under side, near its longitudinal center, the spring-bar E, which is downwardly bent and has its ends bent to form guides adapted to fit over the fender-board F. This fender-board is provided with straps G, which form guides and fit over the said vertical rods C, the said spring being provided to force the fender-board down when released from its elevated position. To the forward face of the said fender-board are secured the curved fender-rods H, which have connected thereto the braces H', which are connected to the said fender-rods by means of a T-joint, and each is provided with a small washer $h$, adjusted to the said T-joint and the washers $h'$ next to the fender-board, through which fender-board the braces pass, and are prevented from being drawn forward through the said aperture by the shouldered ends of the said braces behind the fender-board. Interposed between the said washers $h$ and $h'$ are the springs J, which are provided to take up any vibration when the fender strikes an obstruction. The upper ends of the fender-rods H, which are substantially S-shaped, pass through apertures in the fender-board, and suitable springs K are interposed between washers held on the ends of the said fender-rods and screw-threaded nuts on the extreme ends of the fender-rods, which extend through the board, thus allowing the said ends of the fender-rods to be drawn forward slightly under the tension of the said springs K as the brace-rods are forced back when an obstruction strikes the said fender. Pivoted to the lower outwardly-curved ends of the said fender-rods is the folding portion of the fender M, which may be forwardly extended in a horizontal plane, or when it is desired to fold the same back for the purpose of convenience in coupling the car carrying the fender the fender may be thrown back upon the curved rods.

Pivoted near the edge of the platform of the car on brackets is a foot-lever N, the forward end of which extends underneath the fender-board D and is adapted to rest and work on the antifriction-rollers D', journaled in brackets on the under edge of the said fender-board. The rear end of the said lever is L-shaped for convenience in catching the foot of the operator. Pivoted adjacent to the end of the said lever in the platform of the car is the catch R, which has a hook R', which is normally held in a vertical position by means of weighted extension R² of the said catch resting on the platform of the car. This hook is disposed in the path of the rear L-shaped end of the said foot-lever, and as the said foot-lever is depressed the end thereof strikes against the bevel of the hook and allows the hook to catch over the end of the said lever. For disengaging the said hook from the lever an extended arm R³ is provided, which normally rests at an angle above the platform of the car, and by depressing the said arm the catch is released from the lever and the fender will fall by gravity, aided by the said spring-arm, to its lowest limit, (which is preferably six or eight inches,) which will bring the fender down to a suitable distance above the track to catch any obstruction that the fender might strike.

When it is desired to raise the fender to its elevated position, the operator merely depresses the rear end of the lever and the catch holds the lever down and the fender-board in its elevated position, as will be readily understood.

Having thus described my invention, what I claim to be new, and desire to secure by Letters Patent, is—

1. A fender for cars, consisting of the adjustable strips held to the platform of the car, the vertical rods secured thereto, and the fender-board guided thereon, the cross-strip secured to the upper ends of the said rods, carrying a spring adapted to bear against the upper edge of the said fender-board, the fender carried by the said fender-board, and a foot-lever adapted to bear against the under edge of the said fender for raising the same, and means for disengaging said lever to allow the fender to fall, substantially as shown and described.

2. A fender for street-cars, consisting of the strips held to the platform of the car, the vertical rods carried thereon, the fender-board having straps adapted to fit over and be guided on the said rods, the cross-strip secured to the upper ends of the said rods, the spring-bar secured to the under side of the said strip, and having its ends fitted over and bearing against the upper edge of the said fender-board, the fender carried by the fender-board, the operating-lever pivoted to the platform of the car, with its free end extending under the lower edge of the fender-board, whereby the fender may be raised, and means for holding the fender-board in an elevated position, combined substantially as shown and described.

3. A fender for street-cars, having in combination with the sliding strips held in the platform of the car, the vertical rods carried at the outer ends thereof, the fender-board, the straps thereon, adapted to fit over and be guided on the said rods, the cross-piece fastened to the upper ends of the said rods, the spring-bar secured to the under side of the said strip, the ends of the said spring-bar being bent over the upper edge of the fender-board, the antifriction-roller mounted on the under edge of the fender-board, the operating-lever pivoted to the platform of the car, and having its end extended under the fender-board and bearing against the said antifriction-roller, whereby the fender may be raised to an elevated position, and means for holding the fender-board in such position, as shown and described.

4. In a fender, the combination with the adjustable strips secured to the platform of the car, the vertical rods carried at the outer ends thereof, the fender-board, the strip secured to the upper ends of the said rods, the spring-bar having its ends engaging over the upper edge of the fender-board, the antifriction-roller on the under edge of the said fender-board, the operating-lever pivoted to the platform of the car, the catch pivoted to the platform of the car, the said catch having a weighted member adapted to hold the catch in a vertical position in the path of the operating-lever, and the releasing-arm, whereby the said catch may be disconnected from the operating-lever, as shown and described.

5. The combination with the fender-board mounted as described, the fender-rods and braces connected thereto, the springs carried on the said braces and interposed between the fender-rods and the fender-board, and the springs about the upper ends of the fender-rods on the rear side of the fender-board, substantially as shown and described.

6. In combination with the fender-board mounted as described, the substantially S-shaped fender-rods, the upper ends of which are mounted in apertures in the said fender-board, the springs interposed between the washers on the ends which extend through the fender-board and nuts carried on the screw-threaded ends of the said rods, the brace-rods secured to the fender-rods, and passing through apertures in the fender-board, washers carried on said braces, springs interposed between said washers, shoulders on the ends of the said braces, which extend through the said fender-board to limit the outward throw of the said braces, and the pivoted folding fender carried on the lower outwardly-curved ends of the said fender-rods, all arranged substantially as shown and for the purpose set forth.

In testimony whereof I affix my signature in presence of two witnesses.

JOHN F. BAKER.

Witnesses:
W. A. CULLOP,
C. B. KESSINGER.